(12) United States Patent
Annapragada et al.

(10) Patent No.: US 12,135,150 B2
(45) Date of Patent: Nov. 5, 2024

(54) ELECTROCALORIC HEAT TRANSFER ARTICLES AND SYSTEMS

(71) Applicant: Carrier Corporation, Palm Beach Gardens, FL (US)

(72) Inventors: Subramanyaravi Annapragada, South Windsor, CT (US); Aritra Sur, Manchester, CT (US); Craig R. Walker, South Glastonbury, CT (US); Parmesh Verma, South Windsor, CT (US); Hayden M. Reeve, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 638 days.

(21) Appl. No.: 17/059,836

(22) PCT Filed: Nov. 8, 2019

(86) PCT No.: PCT/US2019/060489
§ 371 (c)(1),
(2) Date: Nov. 30, 2020

(87) PCT Pub. No.: WO2020/097473
PCT Pub. Date: May 14, 2020

(65) Prior Publication Data
US 2021/0254866 A1     Aug. 19, 2021

Related U.S. Application Data

(60) Provisional application No. 62/758,351, filed on Nov. 9, 2018.

(51) Int. Cl.
*F25B 21/00* (2006.01)

(52) U.S. Cl.
CPC ........ *F25B 21/00* (2013.01); *F25B 2321/001* (2013.01); *Y02B 30/00* (2013.01)

(58) Field of Classification Search
CPC ........................... F25B 21/00; F25B 2321/001
See application file for complete search history.

(56) References Cited

U.S. PATENT DOCUMENTS

| | | |
|---|---|---|
| 7,897,898 B2 | 3/2011 | Muller et al. |
| 8,269,098 B2 | 9/2012 | Chu |
| | | (Continued) |

FOREIGN PATENT DOCUMENTS

| | | | |
|---|---|---|---|
| DE | 102015221319 A1 | 5/2017 | |
| WO | 03098120 A1 | 11/2003 | |
| | (Continued) | | |

OTHER PUBLICATIONS

International Search Report for International Application No. PCT/US2019/060489; Application Filign Date: Nov. 8, 2019; Date of Mailing: Jul. 1, 2020; 9 pages.

(Continued)

*Primary Examiner* — Christopher R Zerphey
(74) *Attorney, Agent, or Firm* — CANTOR COLBURN LLP

(57) ABSTRACT

A heat transfer system includes first (62) and second (64) electrocaloric module with aligned first and second sides. First and second prime movers (80,82) are arranged to direct a working fluid in opposite directions along flow paths through the electrocaloric modules. A rotary fluid control device (92,98) including a plurality of openings (94,96,100, 102) is disposed around the electrocaloric modules, and is configured to rotate between positions relative to the modules. In a first position, the first module is in operative fluid communication through the openings with the first prime mover, and the second module is in operative fluid commu- (Continued)

nication through the openings with the second prime mover. In a second position, the first module is in operative fluid communication through the openings with the second prime mover, and the second module is in operative fluid communication through the openings with the first prime mover.

3 Claims, 6 Drawing Sheets

(56) References Cited

U.S. PATENT DOCUMENTS

| | | |
|---|---|---|
| 8,826,684 B2 | 9/2014 | Burk |
| 9,534,814 B2 | 1/2017 | Morimoto et al. |
| 9,746,214 B2 * | 8/2017 | Zimm ............. F25B 21/00 |
| 9,810,454 B2 | 11/2017 | Tasaki et al. |
| 2014/0311165 A1 | 10/2014 | Watanabe et al. |
| 2015/0362202 A1 | 12/2015 | Ikegami et al. |
| 2016/0084544 A1 | 3/2016 | Radermacher et al. |
| 2016/0087185 A1 * | 3/2016 | Cheng ............. F25B 21/00 62/3.1 |
| 2017/0045258 A1 | 2/2017 | Annapragada et al. |
| 2017/0356679 A1 | 12/2017 | Annapragada et al. |
| 2017/0356680 A1 | 12/2017 | Annapragada et al. |
| 2018/0114659 A1 | 4/2018 | Schwartz et al. |

FOREIGN PATENT DOCUMENTS

| | | |
|---|---|---|
| WO | 2015163839 A1 | 10/2015 |
| WO | 2017016691 A1 | 2/2017 |
| WO | 2017030529 A1 | 2/2017 |
| WO | 2017111916 A1 | 6/2017 |
| WO | 2018004520 A1 | 1/2018 |

OTHER PUBLICATIONS

Written Opinion for International Application No. PCT/US2019/060489; Application Filing Date: Nov. 8, 2019; Date of Mailing: Jul. 1, 2020, 10 pages.

* cited by examiner

ELECTROCALORIC HEAT TRANSFER ARTICLES AND SYSTEMS

CROSS REFERENCE TO RELATED APPLICATIONS

This application is a National Stage application of PCT/US2019/060489, filed Nov. 8, 2019, which claims the benefit of U.S. Provisional Application No. 62/758,351, both of which are incorporated by reference in their entirety herein.

BACKGROUND

A wide variety of technologies exist for cooling applications, including but not limited to evaporative cooling, convective cooling, or solid state cooling such as thermoelectric cooling. One of the most prevalent technologies in use for residential and commercial refrigeration and air conditioning is the vapor compression refrigerant heat transfer loop. These loops typically circulate a refrigerant having appropriate thermodynamic properties through a loop that includes a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops. Various technologies have been proposed such as field-active heat or electric current-responsive heat transfer systems relying on materials such as electrocaloric materials, magnetocaloric materials, or thermoelectric materials. However, many proposals have been configured as bench-scale demonstrations with limited capabilities.

BRIEF DESCRIPTION

A heat transfer system is disclosed that includes a first electrocaloric module comprising an electrocaloric material disposed between electrodes, and a first module fluid flow path in operative fluid communication with the electrocaloric material. The first module fluid flow path extends from a first side of the first electrocaloric module to a second side of the first electrocaloric module. The system also includes a second electrocaloric module comprising an electrocaloric material disposed between electrodes, and a second module fluid flow path in operative fluid communication with the electrocaloric material. The second module fluid flow path extends from a first side of the second electrocaloric module to a second side of the second electrocaloric module. The first and second electrocaloric modules are arranged to align the first side of the first electrocaloric module with the first side of the second electrocaloric module, and the second side of the first electrocaloric module with the second side of the second module. A first fluid transport flow path is disposed between a heat source and the first sides of the first and second electrocaloric modules, and a second fluid transport flow path is disposed between a heat sink and the second sides of the first and second electrocaloric modules. A first prime mover is arranged to direct a working fluid in a direction from the first fluid transport flow path through the first or second module fluid flow path to the second fluid transport flow path, and a second prime mover is arranged to direct a working fluid in a direction from the second fluid transport flow path through the first or second module fluid flow path to the first fluid transport flow path. The system also includes a rotary fluid control device including a plurality of openings along the first and second fluid transport flow paths, configured to rotate relative to the electrocaloric modules between first and second positions. In the first position, the first module flow path is in operative fluid communication through the openings with the first prime mover, and the second module flow path is in operative fluid communication through the openings with the second prime mover. In the second position, the first module flow path is in operative fluid communication through the openings with the second prime mover, and the second module flow path is in operative fluid communication through the openings with the first prime mover.

In some embodiments, the rotary fluid control device includes first, second, third, and fourth openings, wherein each of said first, second, third, and fourth openings is in controllable operative fluid communication between two of: the first side of the first electrocaloric module, the first side of the second electrocaloric module, the second side of the first electrocaloric module, and the second side of the second electrocaloric module.

In any one or combination of the foregoing embodiments, the rotary fluid control device comprises: a first valve member including first and second openings disposed on the first fluid transport flow path, and a second valve member including third and fourth openings disposed on the second fluid transport flow path, each of said first and second valve members configured to rotate between the first and second positions about an axis extending between the first and second valve members.

In any one or combination of the foregoing embodiments, in the first position, the first module flow path is in operative fluid communication with the heat source through the first opening and in operative fluid communication with the heat sink through the third opening, and the second electrocaloric module is in operative fluid communication with the heat source through the second opening and is in operative fluid communication with the heat sink through the fourth opening; and in the second position, the first module flow path is in operative fluid communication with the heat source through the second opening and in operative fluid communication with the heat sink through the fourth opening, and the second electrocaloric module is in operative fluid communication with the heat source through the first opening and is in operative fluid communication with the heat sink through the third opening.

In any one or combination of the foregoing embodiments, the first and third openings are disposed radially inward on the first and second valve members, respectively, and the second and fourth openings are disposed radially outward on the first and second valve members, respectively In any one or combination of the foregoing embodiments, the first and second prime movers comprise first and second fans disposed in alignment with the first and third openings.

In any one or combination of the foregoing embodiments, the first and second prime movers comprise first and second fans disposed in alignment with the second and fourth openings.

In any one or combination of the foregoing embodiments, the first fluid transport flow path includes a first shared flow path disposed between and in operative in operative fluid communication with the first valve member and the first sides of the first and second electrocaloric modules.

In any one or combination of the foregoing embodiments, the second fluid transport flow path includes a second shared flow path disposed between and in operative in operative fluid communication with the second valve member and the second sides of the first and second electrocaloric modules.

In any one or combination of the foregoing embodiments, the first valve member and first and second electrocaloric modules are arranged to provide dedicated fluid flow paths between the first sides of the first and second electrocaloric modules, and the openings of the first valve member in the first and second positions.

In any one or combination of the foregoing embodiments, the second valve member and first and second electrocaloric modules are arranged to provide dedicated fluid flow paths between the second sides of the first and second electrocaloric modules, and the openings of the second valve member in the first and second positions.

In any one or combination of the foregoing embodiments, the system can comprise a plurality of electrocaloric modules in operable fluid communication with the first and second fluid transport flow paths, wherein the first and second valve members each includes a plurality of openings and dedicated flow paths corresponding to the number of electrocaloric modules.

In any one or combination of the foregoing embodiments, the system can further comprise an external header fluidly connecting a plurality of openings on the first or second valve member to the first or second prime mover, respectively.

In any one or combination of the foregoing embodiments, the system can comprise a plurality of first or second prime movers, each fluidly connected to a one of the plurality of openings.

In some embodiments, the fluid control device can comprise a continuous band including first, second, third, and fourth openings disposed around the first and second electrocaloric modules intersecting the first and second fluid transport flow paths, said bands configured to rotate around an axis transverse to the first and second module fluid flow paths.

In some embodiments, first and second openings are disposed on opposite ends of the band centrally with respect to the axis transverse to the first and second module fluid flow paths, and third and fourth openings are disposed on opposite ends of the band peripherally with respect to the axis transverse to the first and second module fluid flow, with the third opening on the same end of the band as the first opening, and the fourth opening on the same end of the band as the second opening.

In any one or combination of the foregoing embodiments including a band, wherein the first and second prime movers comprise first and second fans disposed in alignment with the first and second band openings.

In any one or combination of the foregoing embodiments including a band, in the first position, the first module flow path is in operative fluid communication with the heat source through the first opening and in operative fluid communication with the heat sink through the fourth opening, and the second electrocaloric module is in operative fluid communication with the heat source through the third opening and is in operative fluid communication with the heat sink through the second opening; and in the second position, the first module flow path is in operative fluid communication with the heat source through the fourth opening and in operative fluid communication with the heat sink through the first opening, and the second electrocaloric module is in operative fluid communication with the heat source through the second opening and is in operative fluid communication with the heat sink through the third opening.

In any one or combination of the foregoing embodiments, the openings of the rotary fluid control device are arranged to cause fluid flow along the first and second module fluid flow paths to be out of phase with respect to one another regarding direction of fluid movement along the first and second module fluid flow paths.

In any one or combination of the foregoing embodiments, the openings of the rotary fluid control device are arranged to cause fluid flow along the first and second module fluid flow paths to be 180° out of phase with respect to one another regarding direction of fluid movement along the first and second module fluid flow paths.

In any one or combination of the foregoing embodiments, the rotary fluid control device is configured for continuous rotation.

In any one or combination of the foregoing embodiments, the rotary fluid control device is configured for intermittent rotation.

In any one or combination of the foregoing embodiments, the rotary fluid control device is configured for mono-directional rotation.

In any one or combination of the foregoing embodiments, the rotary fluid control device is configured for bi-directional rotation.

Also disclosed is a method of transferring heat with the heat transfer system of any one or combination of the foregoing embodiments. According to the method, voltage is selectively applied to the electrodes, the first and second prime movers are operated, and the rotary fluid control device is rotated in coordination with application of voltage to the electrodes, to direct a bi-directional regenerative fluid flow along the first and second module fluid flow paths and transfer heat from the heat source to the electrocaloric material and from the electrocaloric material to the heat sink.

In some embodiments of the foregoing method, the rotary fluid control device is rotated continuously.

In some embodiments of the foregoing method, the rotary fluid control device is rotated intermittently.

In some embodiments of the foregoing method, the rotary fluid control device is rotated in a mono-direction.

In some embodiments of the foregoing method, the rotary fluid control device is rotated bi-directionally.

Also disclosed is a heat transfer system comprising an electrocaloric module comprising an electrocaloric element, a first fluid transport flow path including a working fluid in operative fluid communication with a first side of the electrocaloric module and in operative thermal communication with a heat sink, and a second fluid transport flow path including the working fluid in operative fluid communication with a second side of the electrocaloric module and in operative thermal communication with a heat source. A first prime mover is arranged to direct the working fluid in a first direction from the first fluid transport flow path to the second fluid transport flow path. A second prime mover is arranged to direct the working fluid in a second direction from the second fluid transport flow path to the first fluid transport flow path. A first module fluid flow path extends through the electrocaloric module in operative fluid communication with the electrocaloric element, the first and second fluid transport flow paths and the first prime mover. A second module fluid flow path extends through the electrocaloric module in operative fluid communication with the electrocaloric element, the first and second fluid transport flow paths and the second prime mover. The electrocaloric element includes a sheet comprising an electrocaloric material in operative fluid communication with the first and second module fluid flow paths, a first electrode at a first polarity disposed on the first module fluid flow path at an outer edge of the sheet, a second electrode at a second polarity of opposite charge to the first electrode disposed on the second module fluid flow path at an outer edge of the sheet, and a ground or neutral electrode disposed at an axis transverse to the sheet about which the sheet is configured to rotate.

In some embodiments, the sheet extends along a plane that is parallel with a fluid flow direction on the first and second module fluid flow paths.

In any one or combination of the foregoing embodiments including a rotating sheet, the sheet is configured as a mesh.

In any one or combination of the foregoing embodiments including a rotating sheet, the sheet extends along a plane that is transverse to a fluid flow direction on the first and second module fluid flow paths.

In any one or combination of the foregoing embodiments including a rotating sheet, the sheet comprises a mesh substrate and an electrocaloric material disposed on the mesh substrate.

In any one or combination of the foregoing embodiments including a rotating sheet, the sheet is configured for continuous rotation.

In any one or combination of the foregoing embodiments including a rotating sheet, the sheet is configured for intermittent rotation.

In any one or combination of the foregoing embodiments including a rotating sheet, the sheet is configured for monodirectional rotation.

In any one or combination of the foregoing embodiments including a rotating sheet, the rotary fluid control device is configured for bi-directional rotation.

Also disclosed is a method of transferring heat with the heat transfer system of any one or combination of the foregoing embodiments including a rotating sheet. According to the method, voltage is selectively applied to the electrodes, the first and second prime movers are operated, and the sheet is rotated in coordination with application of voltage to the electrodes, to expose portions of the sheet to a bi-directional regenerative fluid flow along the first and second module fluid flow paths and transfer heat from the heat source to the electrocaloric material and from the electrocaloric material to the heat sink.

In some embodiments of the foregoing method, the sheet is rotated continuously.

In some embodiments of the foregoing method, the sheet is rotated intermittently.

In some embodiments of the foregoing method, the sheet is rotated in a mono-direction.

In some embodiments of the foregoing method, the sheet is rotated bi-directionally.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
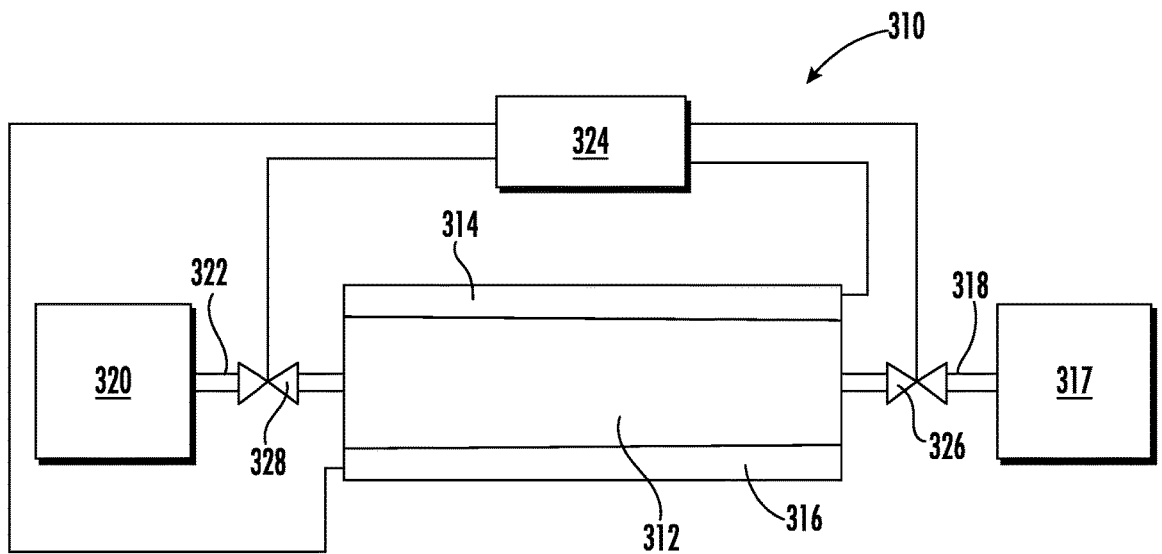
FIG. 1 is a schematic depiction of an example embodiment of an electrocaloric heat transfer system.

An example embodiment of a heat transfer system and its operation are described with respect to FIG. 1. As shown in FIG. 1, a heat transfer system 310 comprises an electrocaloric material 312 with first and second electrical buses 314 and 316 in electrical communication with electrodes on the electrocaloric material. The electrocaloric material 312 is in thermal communication with a heat sink 317 through a first thermal flow path 318, and in thermal communication with a heat source 320 through a second thermal flow path 322. The thermal flow paths are described below with respect to thermal transfer through the flow of a working fluid through control devices 326 and 328 (e.g., flow dampers) between the electricaloric material 312 and the heat sink 317 and heat source 320. A controller 324 is configured to control electrical current to through a power source (not shown) to selectively activate the buses 314, 316. In some embodiments, the electrocaloric material can be activated by energizing one bus bar/electrode while maintaining the other bus bar/electrode at a ground polarity. The controller 324 is also configured to open and close control devices 326 and 328 to selectively direct the working fluid along the first and second flow paths 318 and 322.

In operation, the system 310 can be operated by the controller 324 applying an electric field as a voltage differential across the electrocaloric material 312 to cause a decrease in entropy and a release of heat energy by the electrocaloric material 312. The controller 324 opens the control device 326 to transfer at least a portion of the released heat energy along flow path 318 to heat sink 317. This transfer of heat from the electrocaloric material 312 to the working fluid can occur after the temperature of the electrocaloric material 312 has risen beyond a threshold temperature. In some embodiments, heat transfer to the heat sink 317 is begun as soon as the temperature of the electrocaloric material 312 increases to be about equal to the temperature of the heat sink 317. After application of the electric field for a time to induce a desired release and transfer of thermal energy from the electrocaloric material 312 to the heat sink 317, the electric field can be removed. Removal of the electric field causes an increase in entropy and a decrease in thermal energy of the electrocaloric material 312. This decrease in thermal energy manifests as a reduction in temperature of the electrocaloric material 312 to a temperature below that of the heat source 320. The controller 324 closes control device 326 to terminate flow along flow path 318, and opens control device 328 to transfer heat from the source 320 to the colder electrocaloric material 312 in order to bring the electrocaloric material 312 to the initial thermal state thus regenerating it for another cycle.

In some embodiments, for example where a heat transfer system is utilized to maintain a temperature in a conditioned space or thermal target, the electric field can be applied to the electrocaloric material 312 to increase temperature until the temperature reaches a first threshold. After the first temperature threshold, the controller 324 opens control device 326 to transfer heat from the electrocaloric material 312 to the heat sink 317 until a second temperature threshold is reached. The electric field can continue to be applied during all or a portion of the time period between the first and second temperature thresholds, and is then removed to reduce the temperature until a third temperature threshold is reached. The controller 324 then closes control device 326 to terminate heat flow transfer along heat flow path 318, and opens control device 328 to transfer heat from the heat source 320 to the electrocaloric material 312. The above steps can be optionally repeated until a target temperature of the conditioned space or thermal target (which can be either the heat source or the heat sink) is reached.

In some embodiments, the electrocaloric material 312 referenced above can comprise an electrocaloric film connected to a frame. The frame can include various configurations, including but not limited to full peripheral frames (e.g., 'picture' frames) and components thereof, partial peripheral frames and components thereof, or internal frames and components thereof. In some embodiments, the frame can be part of a repeating modular structure that can be assembled along with a set of electrocaloric films in a stack-like fashion. In some embodiments, the frame can be a unitary structure equipped with one or more attachment points to receive one or more of electrocaloric films.

Figure 2:
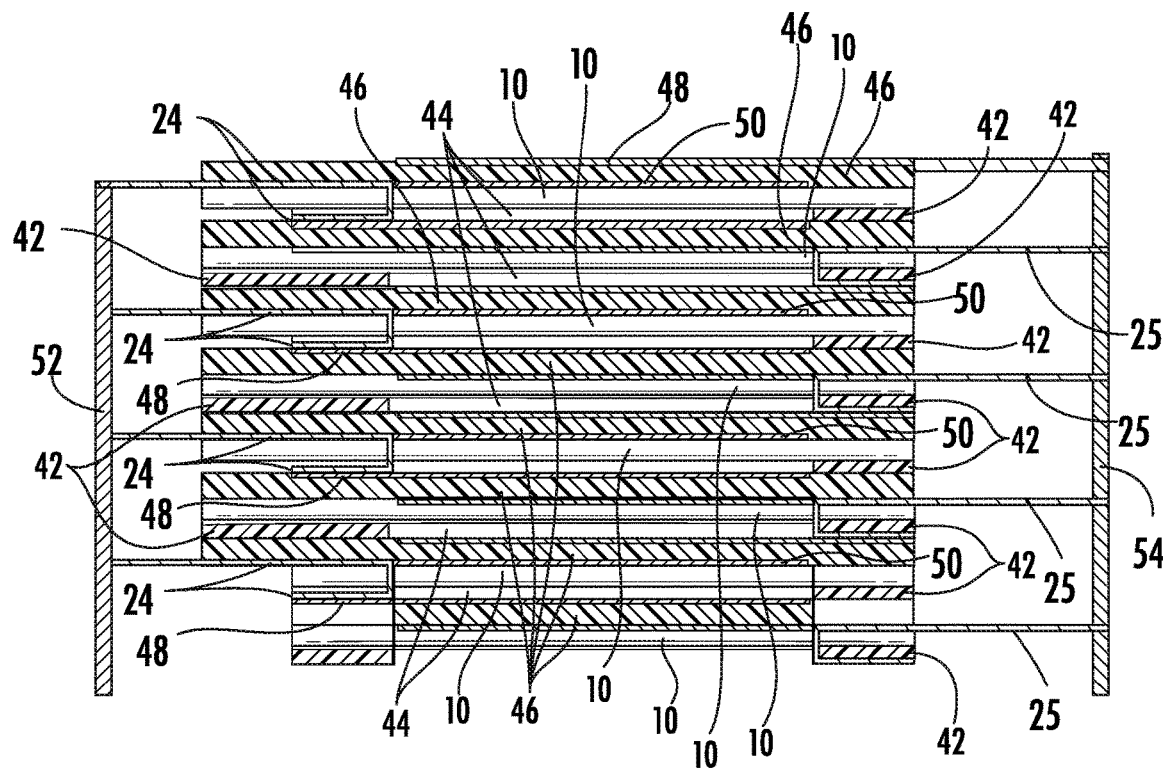
FIG. 2 schematically shows an example embodiment of a plurality of electrocaloric film segments in a stacked configuration.

In some embodiments, a heat transfer device can include a plurality of electrocaloric film segments in a stack configuration arranged to provide flow paths for a working fluid between adjacent electrocaloric film segments. A stack of repeating modular framed electrocaloric films 46 is schematically shown in a cross-sectional view in FIG. 2. The order of assembly can be varied and adapted to achieve target specifications, and the order shown in FIG. 2 is a typical example including peripheral frames 10, spacers 42, electrocaloric elements having electrocaloric films 46 with first electrodes 48 and second electrodes 50, and first and second electrically conductive elements 24, 25 electrically connected to the first and second electrodes 48, 50 and to first and second electrical buses 52, 54, respectively. As shown in FIG. 2, the electrocaloric films are disposed in the stack with a configuration such that the relative (top/bottom) orientation of the first and second electrodes 48, 50 is alternated with adjacent films so that each fluid flow path 44 has electrodes of matching polarity on each side of the fluid flow path 44, which can inhibit arcing across the flow path gap.

It should be noted that although FIG. 2 discloses individual segments of electrocaloric film attached to a peripheral frame in a picture-frame configuration, other configurations of electrocaloric articles can be utilized such as electrocaloric articles formed from a continuous sheet of electrocaloric film, or different frame configurations such as internal frame components (e.g., stack spacers) or peripheral frames covering less than the full perimeter of the electrocaloric film, or combinations of the above features with each other or other features. Continuous sheets of electrocaloric film can be dispensed directly from a roll and manipulated by bending back and forth into a stack-like configuration, or can be cut into a pre-cut length and bent back and forth into the stack-like configuration. Additional disclosure regarding continuous sheet electrocaloric articles can be found in PCT published application no. WO2017/111916 A1, and in U.S. patent application Ser. No. 62/722,736, the disclosures of both of which are incorporated herein by reference in their entirety.

As mentioned above, the electrocaloric module includes an electrocaloric material, such as an electrocaloric film that can be formed into a stack-like structure. Examples of electrocaloric materials for the electrocaloric film can include but are not limited to inorganic (e.g., ceramics) or organic materials such as electrocaloric polymers, crystalline material, and polymer/ceramic composites. Composite materials such as organic polymers with inorganic fillers and/or fillers of a different organic polymer. Examples of inorganic electrocaloric materials include but are not limited to $PbTiO_3$ ("PT"), $Pb(Mg_{1/3}Nb_{2/3})O_3$ ("PMN"), PMN-PT, $LiTaO_3$, barium strontium titanate (BST) or PZT (lead, zirconium, titanium, oxygen). Examples of electrocaloric polymers include, but are not limited to ferroelectric polymers, liquid crystal polymers, and liquid crystal elastomers. Ferroelectric polymers are crystalline polymers, or polymers with a high degree of crystallinity, where the crystalline alignment of polymer chains into lamellae and/or spherulite structures can be modified by application of an electric field. Such characteristics can be provided by polar structures integrated into the polymer backbone or appended to the polymer backbone with a fixed orientation to the backbone. Examples of ferroelectric polymers include polyvinylidene fluoride (PVDF), polytriethylene fluoride, odd-numbered nylon, copolymers containing repeat units derived from vinylidene fluoride, and copolymers containing repeat units derived from triethylene fluoride. Polyvinylidene fluoride and copolymers containing repeat units derived from vinylidene fluoride have been widely studied for their ferroelectric and electrocaloric properties. Examples of vinylidene fluoride-containing copolymers include copolymers with methyl methacrylate, and copolymers with one or more halogenated co-monomers including but not limited to trifluoroethylene, tetrafluoroethylene, chlorotrifluoroethylene, trichloroethylene, vinylidene chloride, vinyl chloride, and other halogenated unsaturated monomers. In some embodiments, the electrocaloric film can include a polymer composition according to WO 2018/004518 A1 or WO 2018/004520 A1, the disclosures of which are incorporated herein by reference in their entirety.

Liquid crystal polymers, or polymer liquid crystals comprise polymer molecules that include mesogenic groups. Mesogenic molecular structures are well-known, and are often described as rod-like or disk-like molecular structures having electron density orientations that produce a dipole moment in response to an external field such as an external electric field. Liquid crystal polymers typically comprise numerous mesogenic groups connected by non-mesogenic molecular structures. The non-mesogenic connecting structures and their connection, placement and spacing in the polymer molecule along with mesogenic structures are important in providing the fluid deformable response to the external field. Typically, the connecting structures provide stiffness low enough so that molecular realignment is induced by application of the external field, and high enough to provide the characteristics of a polymer when the external field is not applied. In some exemplary embodiments, a liquid crystal polymer can have rod-like mesogenic structures in the polymer backbone separated by non-mesogenic spacer groups having flexibility to allow for re-ordering of the mesogenic groups in response to an external field. Such polymers are also known as main-chain liquid crystal polymers. In some exemplary embodiments, a liquid crystal polymer can have rod-like mesogenic structures attached as side groups attached to the polymer backbone. Such polymers are also known as side-chain liquid crystal polymers. Electrodes on the electrocaloric film can take different forms with various electrically conductive components. The electrodes can be any type of conductive material, including but not limited to metallized layers of a conductive metal such as aluminum or copper, or other conductive materials such as carbon (e.g., carbon nanotubes, graphene, or other conductive carbon). Noble metals can also be used, but are not required. Other conductive materials such as a doped semiconductor, ceramic, or polymer, or conductive polymers can also be used. In some embodiments, the electrodes can be in the form of metalized layers or patterns on each side of the film such as disclosed in published PCT application WO 2017/111921 A1 or U.S. patent application 62/521,080, the disclosures of each of which is incorporated herein by reference in its entirety.

In some embodiments, electrocaloric film thickness can be in a range having a lower limit of 0.1 µm, more specifically 0.5 µm, and even more specifically 1 µm. In some embodiments, the film thickness range can have an upper limit of 1000 µm, more specifically 100 µm, and even more specifically 10 µm. It is understood that these upper and lower range limits can be independently combined to disclose a number of different possible ranges. Within the above general ranges, it has been discovered that thinner films can promote efficiency by reducing parasitic thermal losses, compared to thicker films.

Figure 3A:
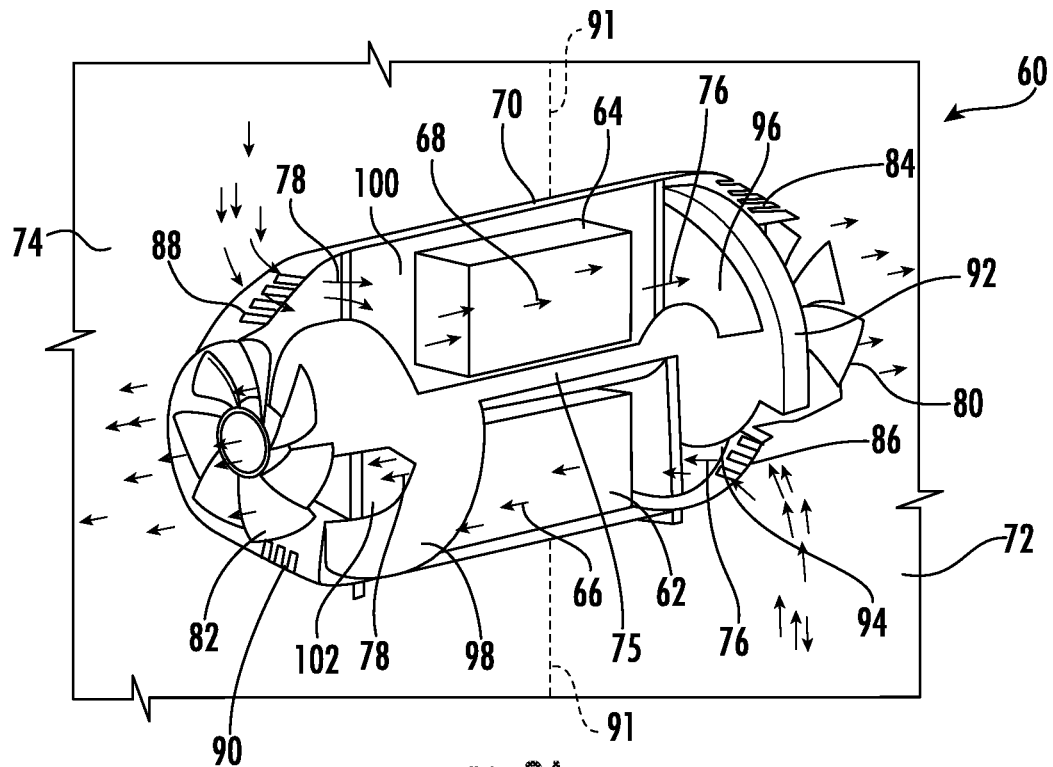
FIGS. 3A and 3B each schematically shows an electrocaloric article with an example embodiment of a rotary valve based flow control device with a shared fluid flow path between the rotating valve and electrocaloric modules in different operational states.
Figure 3B:
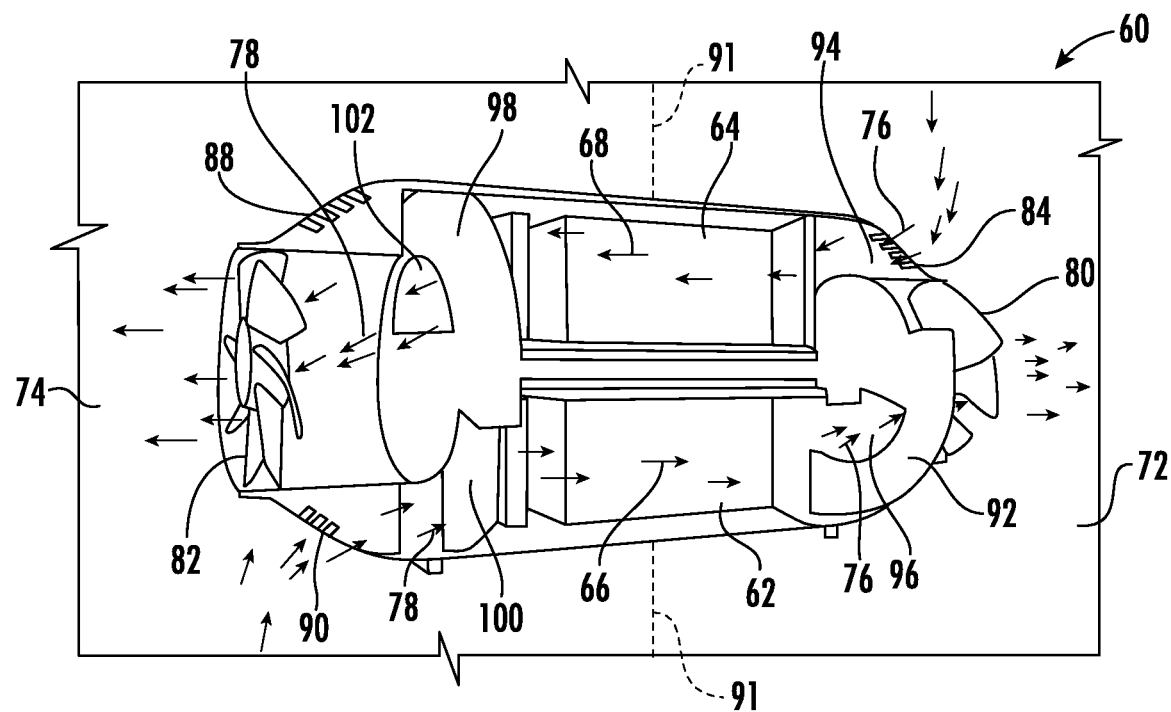

As mentioned above, the heat transfer system includes a rotary fluid control device configured to rotate between first and second positions to control fluid flow through the electrocaloric modules 62/64 and provide a regenerative bi-directional flow along the module fluid flow paths. An example embodiment of a heat transfer device 60 with a rotary fluid control device is schematically shown in FIGS. 3A and 3B. As shown in FIGS. 3A and 3B, electrocaloric modules 62 and 64 with module fluid flow paths 66 and 68 are disposed in a housing 70 (housing shown in cut-away view). The heat transfer device is shown in operative fluid and thermal communication with a heat source 72 and heat sink 74 in the form of large air spaces (e.g., an indoor conditioned space as a heat source and an outdoor space as a heat sink). The heat transfer device 60 can be disposed between the inside conditioned space and the outdoor space such as mounted in a wall or window 91, but could also be fluidly connected to any heat source or heat sink by a heat transfer fluid flow loop (not shown) in operative fluid communication with a heat exchanger that is in thermal communication with a heat source or heat sink. A fluid transport flow path 76 external to the electrocaloric modules 62/64) provides bi-directional fluid communication between the electrocaloric modules 62/64 and the heat source 72, and a fluid transport flow path 78 provides bi-directional fluid communication between the electrocaloric modules 62/64 and the heat sink 74. A fan 80 is shown as a prime mover arranged to direct air flow in a direction from the fluid transport flow path 76 to the fluid transport flow path 78 heat source. A fan 82 is shown as a prime mover arranged to direct air flow from the fluid transport flow path 78 to the fluid transport flow path 76.

Air flow in and out of the device is represented by numbered and unnumbered arrows, and is accommodated through inlets 84 and 86 on one side of the electrocaloric modules 62/64, inlets 88 and 90 on the other sides of the electrocaloric modules 62/64, and outlets through the fans 80 and 82. As mentioned above, the heat transfer system includes a rotary fluid control device, in this example embodiment in the form of a valve member 92 with openings 94 and 96, and a valve member 98 with openings 100 and 102. The valve members are shown as rotatable about an axis coincident with shaft 75 driven by a drive mechanism (not shown), but can each have their own shaft or drive mechanism for rotation. Also, the axis of rotation in FIGS. 3A/3B is shown as a single centrally located axis parallel with the direction of air flow through the device 60, but variations can be independently made to each axis of rotation, and each of the valve members 92/98 can have its own axis of rotation that extends in any direction between the valve members 92 and 98. It should also be noted that the rotation is shown with rotating valve members, but that rotation of the rotary fluid control device is relative to the electrocaloric modules, so the valve members could also be maintained stationary while the assembly of electrocaloric module is rotated.

Operation of the rotary fluid control device is illustrated by FIGS. 3A and 3B, with FIG. 3A showing the valve members 92 and 98 in one position, and FIG. 3B showing the valve members 92 and 98 in another position. As can be seen in FIGS. 3A and 3B, the valve openings 96 and 102 are arranged at a radially central portion of the valve members to align with and provide operative fluid communication between the fans 80/82 and the electrocaloric modules 62/64. The valve openings 94 and 100 are arranged at a radially peripheral portion to align with and provide operative fluid communication between the electrocaloric modules 62/64 and the inlets 84/86/88/90. In the position shown in FIG. 3A, the valve opening 96 is aligned to provide operative fluid communication between the fan (outlet) 80 and the first side of the second electrocaloric module 64 while the valve opening 94 is aligned to provide operative fluid communication between the inlet 86 and the adjacent side of the first electrocaloric module 62. Also, as shown in FIG. 3A, the valve opening 102 is aligned to provide operative fluid communication between the fan (outlet) 82 and the adjacent side of the first electrocaloric module 62 while the valve opening 100 is aligned to provide operative fluid communication between the inlet 88 and the adjacent side of the second electrocaloric module 64. This alignment and operation of the fan 82 provide a fluid flow from the heat source 72, through the inlet 86, along the fluid transport flow path 76, the module fluid flow path 66, and the fluid transport flow path 78 to the heat sink 74. Operation of the fan 80 in this alignment provides a fluid flow from the heat sink 74, through the inlet 88, along the fluid transport flow path 78, the module fluid flow path 68, and the fluid transport flow path 76 to the heat source 72.

The valve members 92/98 are shown in another position in FIG. 3B. As shown in FIG. 3B, the valve opening 96 is aligned to provide operative fluid communication between the fan (outlet) 80 and the adjacent side of the electrocaloric module 62 while the valve opening 94 is aligned to provide operative fluid communication between the inlet 84 and the adjacent side of the electrocaloric module 64. Also, as shown in FIG. 3B, the valve opening 102 is aligned to provide operative fluid communication between the fan (outlet) 82 and the adjacent side of the electrocaloric module 64 while the valve opening 100 is aligned to provide operative fluid communication between the inlet 90 and the adjacent side of the electrocaloric module 62. This alignment and operation of the fan 82 provide a fluid flow from the heat source 72, through the inlet 84, along the fluid transport flow path 76, the module fluid flow path 68, and the fluid transport flow path 78 to the heat sink 74. Operation of the fan 80 in this alignment provides a fluid flow from the heat sink 74, through the inlet 90, along the fluid transport flow path 78, the module fluid flow path 66, and the fluid transport flow path 76 to the heat source 72.

As can be seen from FIGS. 3A and 3B (as well as FIGS. 4A/4B, 5A/5B, and 6A/6B), the direction of fluid flow along the module fluid flow paths 66 and 68 is reversed between the different positions of the rotary fluid control device. Accordingly, simple rotation of the valve members 80 and 82 can provide a technical effect of a bi-directional back-and-forth flow through the electrocaloric modules 62 and 64 that can promote enhanced internal thermal regeneration of the electrocaloric material during operation in coordination with energization and de-energization (or alternating polarity) of the electrodes to controllably activate the electrocaloric material. This internal regenerative capacity can in turn promote greater temperature lift (i.e., temperature differential) across the heat transfer device.

It should be noted that the embodiments shown in FIGS. 3A and 3B are representative examples of components and their arrangement, and that variations can be implemented for FIGS. 3A/3B as well as for the embodiments of FIGS. 4A/4B, 5A/5B, and 6A/6B described below. For example, as mentioned above, a heat transfer fluid in a heat transfer loop connected to a heat source or heat sink can be used as a working fluid instead of air. In the case of a heat transfer fluid in a liquid state, various modifications can be made for moving and directing the liquid flow (e.g., the use of liquid pumps instead of fans). Additionally, the direction of fan rotation can be reversed, in which case all fluid flows would be reversed. Also, the shape or profile of the openings 94, 96, 100, and 102 can be configured to provide a desired fluid flow direction transition between the flow states shown in FIGS. 3A and 3B. In some embodiments, the rotation of the rotary devices described herein can be in a mono-direction, which can provide a technical effect of promoting simple design and reliable operation. In some embodiments, the rotary devices described herein can alternatively be bi-directional, which can allow for different shape profiles on different edges of the openings to provide controllably different flow direction transitions depending on the direction of rotation. In some embodiments, the direction of operation can be controlled to be mono-directional or bi-directional according to process control parameters. In some embodiments, the speed of rotation can be variably controlled (in coordination with energization of the electrodes) to provide a desired flow direction transition and/or phase change of the electrocaloric material. Additionally, any of the electrocaloric heat transfer devices can arranged in a cascade with other electrocaloric heat transfer devices such as disclosed in US Patent Pub. No. 2017/0356679 A1, the disclosure of which is incorporated herein by reference in its entirety.

Figure 4A:
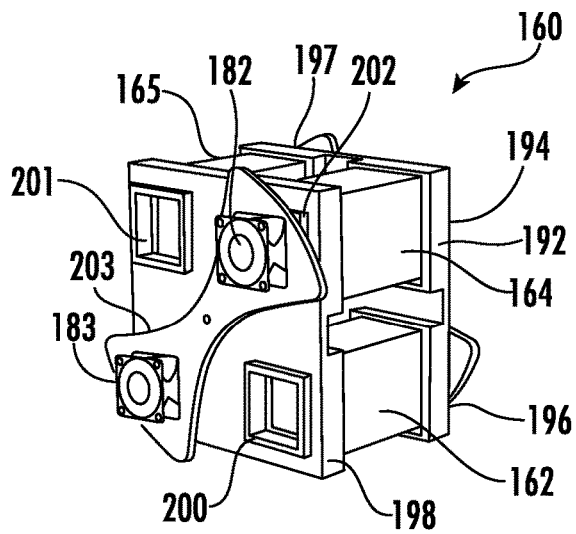
FIGS. 4A and 4B each schematically shows an electrocaloric article with an example embodiment of a rotary valve based flow control device with a dedicated fluid flow path between the rotating valve and electrocaloric modules in different operational states.
Figure 4B:
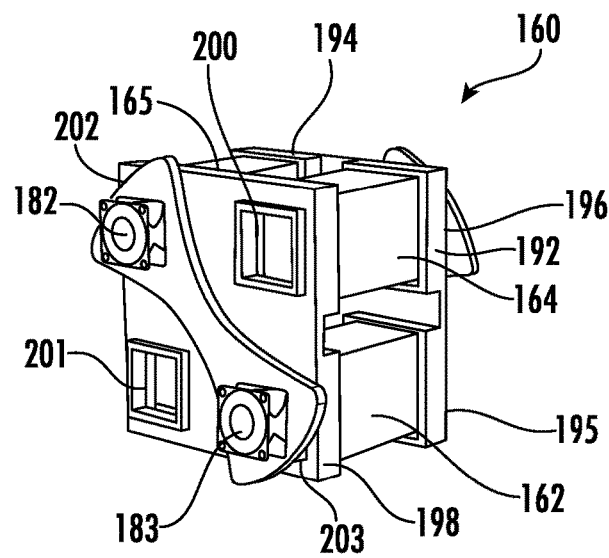
Figure 5A:
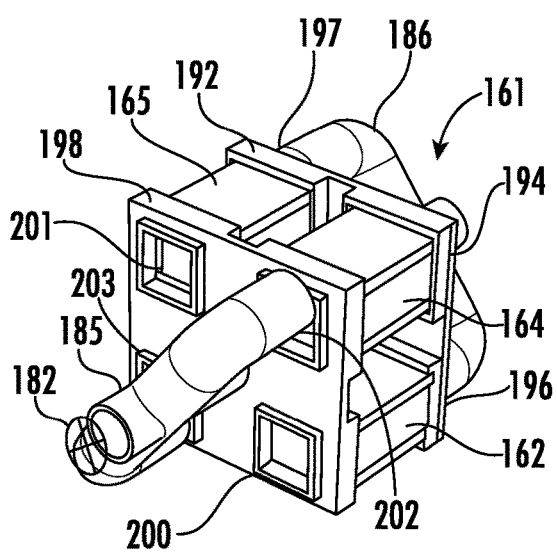
FIGS. 5A and 5B each schematically shows an electrocaloric article with an example embodiment of another rotary valve based flow control device in different operational states.

Another example embodiment of a rotary fluid control device is shown in heat transfer device 160 in FIGS. 4A/4B and heat transfer device 161 in FIGS. 5A/5B. As shown in FIGS. 4A/4B and 5A/5B, a rotary fluid control device is provided in the form of a plenum or header 192 with openings 194, 195, 196, and 197, and a plenum or header 198 with openings 200, 201, 202, and 203. Compared to the embodiment of FIGS. 3A/3B with a valve member that guides along different routes through shared fluid flow paths (i.e., an internal header) between the inlets/outlets and the electrocaloric modules, the external plenum/header structures can provide for dedicated flow paths between the openings of the rotary fluid control device and the electrocaloric modules. In some embodiments, the rotating plenum or header configuration can provide a technical effect of promoting avoidance of efficiency losses associated with fluid flow through an internal header structure, and can also readily accommodate multiple numbers of electrocaloric modules, with the heat transfer device 160 including four electrocaloric modules 162, 163 (not shown in this view), 164, and 165. FIGS. 4A/4B shows dedicated fans 180/181 aligned with openings (196/197 in FIG. 4A and 194/195 in FIG. 4B), and dedicated fans 182/183 aligned with openings (202/203 in FIG. 4A and 200/201 in FIG. 4B), whereas FIGS. 5A/5B show a single fan 180 connected with openings through an external header 179 and a single fan 182 connected with openings through an external header 185 (and another header 186 with an opposite direction fan for openings on the opposite end of the device), but otherwise FIGS. 4A/4B are the same as FIGS. 5A/5B.

In operation, in the first position shown in FIGS. 4A and 5A, the openings 196/197 are aligned to provide operative fluid communication between the fan(s) 180 (FIG. 5A) or 180/181 (FIG. 4A) with the adjacent sides of the electrocaloric modules 162/165, while the openings 194/195 are aligned to provide operative fluid communication with the adjacent sides of the electrocaloric modules 163/164. Also, as shown in FIGS. 4A/5A, the openings 202/203 are aligned to provide operative fluid communication between the fan(s) 182 (FIG. 5A) or 182/183 (FIG. 4A) and the adjacent sides of the electrocaloric modules 163/164, while the openings 200/201 are aligned to provide operative fluid communication with the adjacent sides of the electrocaloric modules 162/165. With the fan(s) 180/181/182/183 blowing in an exhaust direction (i.e., acting as outlets), the alignment and operation of the fan(s) 82 in FIGS. 4A/5A provide fluid flow from the heat source 72 toward the heat sink 74 in electrocaloric modules 163 and 164, and from the heat sink 74 toward the heat source 72 in electrocaloric modules 162 and 165.

Figure 5B:
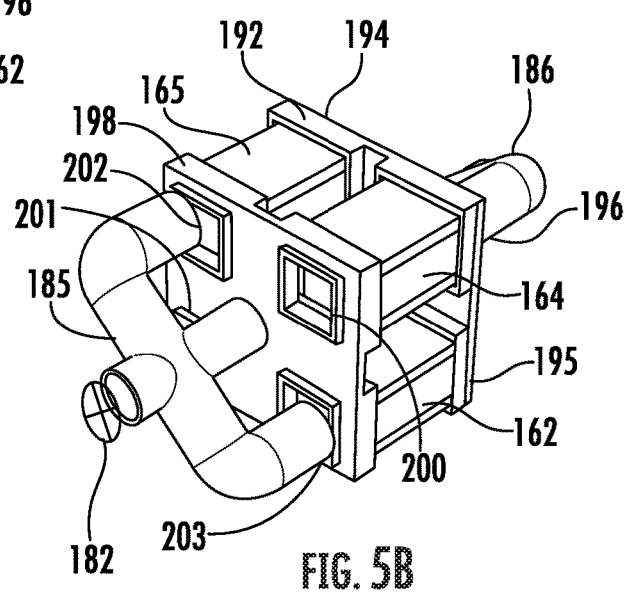

The plenum/headers 192/198 are shown in an alternate position in FIGS. 4B and 5B. As shown in FIGS. 4B/5B, the fan(s) 180 (FIG. 5B) or 180/181 (FIG. 4B) are in fluid communication with the adjacent sides of the electrocaloric modules 163/164, while the openings 194/195 are aligned to provide operative fluid communication with the adjacent side of the electrocaloric modules 162/165. Also, as shown in FIGS. 4B/5B, the openings 202/203 are aligned to provide operative fluid communication between the fan(s) 182 (FIG. 5B) or 182/183 (FIG. 4B) and the adjacent sides of the electrocaloric modules 162/165, while the openings 200/201 are aligned to provide operative fluid communication with the adjacent sides of the second electrocaloric modules 163/164. With the fan(s) 180/181/182/183 blowing in an exhaust direction (i.e., acting as outlets), the alignment and operation of the fan(s) 82 in FIGS. 4B/5B provide fluid flow from the heat source 72 toward the heat sink 74 in electrocaloric modules 162 and 165, and from the heat sink 74 toward the heat source 72 in electrocaloric modules 163 and 164.

Figure 6A:
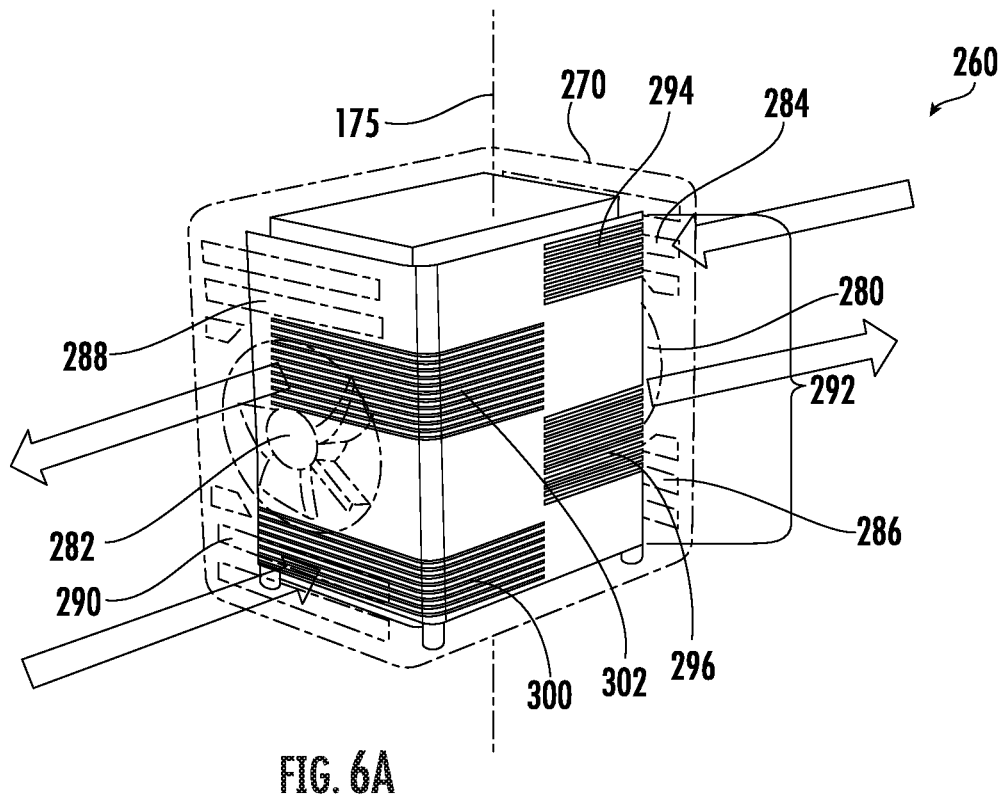
FIGS. 6A, 6B, and 6C schematically show an electrocaloric article with an example embodiment of a rotating belt fluid control device in different operational states.
Figure 6B:
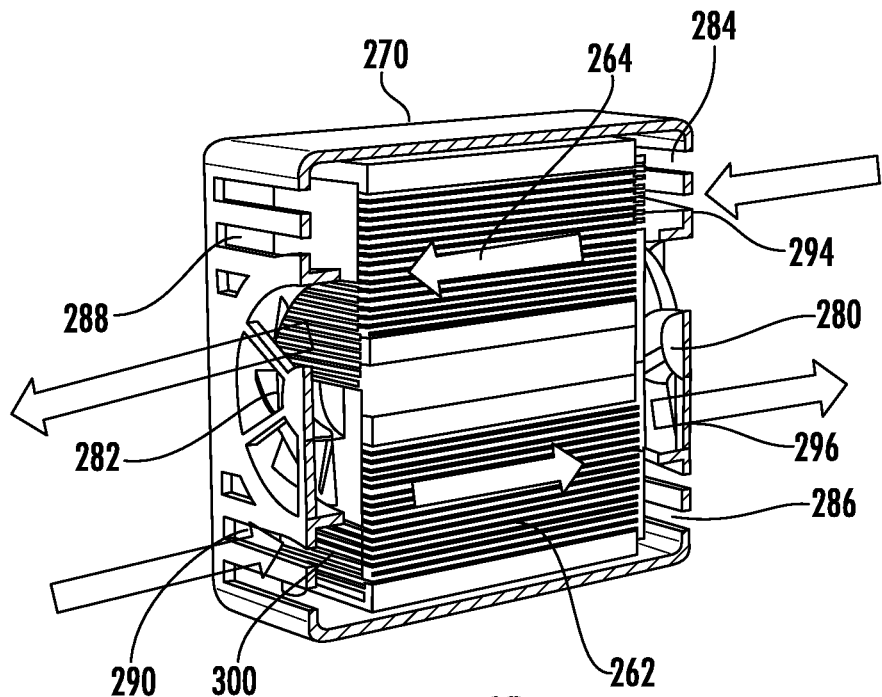
Figure 6C:
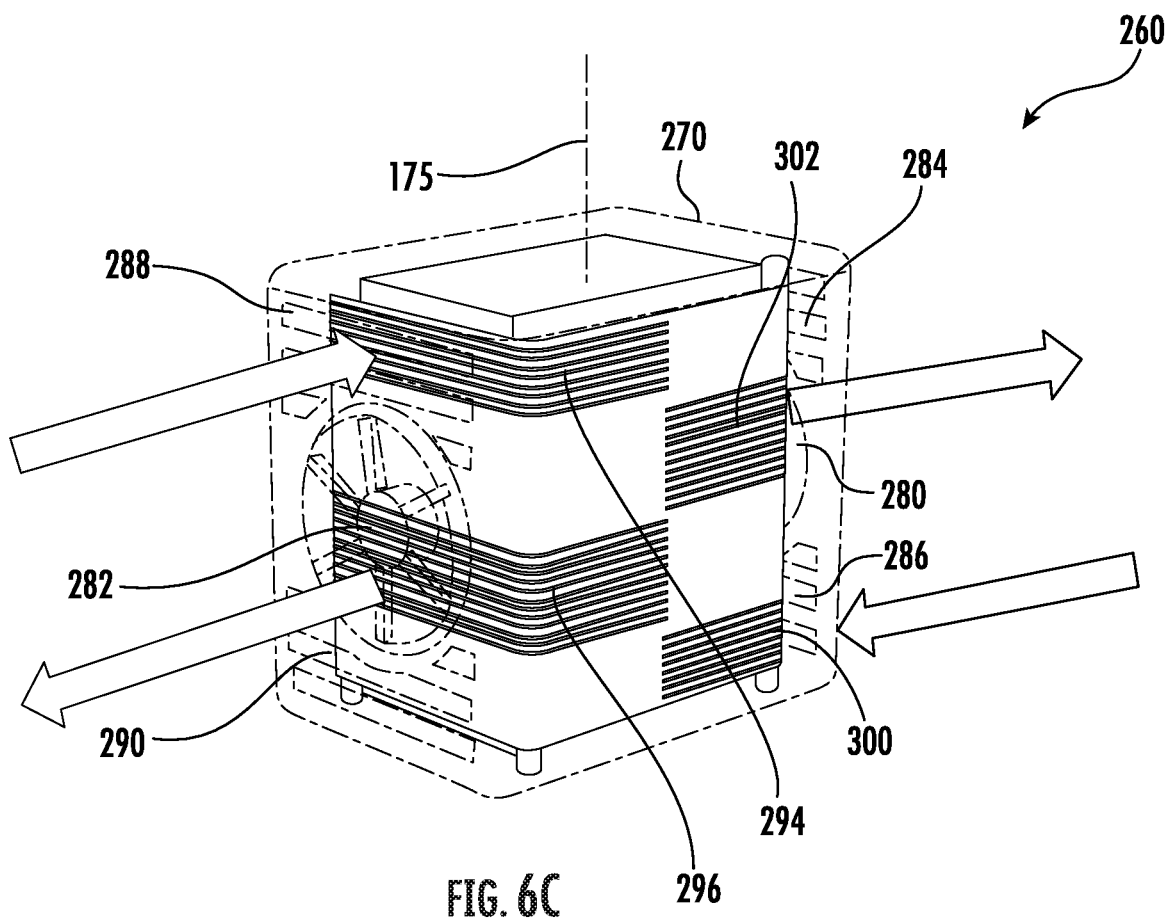

Another example embodiment of a rotary fluid control device is shown in heat transfer device 260 in FIGS. 6A-6C. As shown in FIGS. 6A-6C, a band 292 (or multiple bands) with a plurality of openings 294, 296, 300, and 302, is rotatable about an axis 175 driven by a drive mechanism (not shown). The axis 175 is shown as perpendicular to the direction of air flow through the heat transfer device, but can be at any angle transverse to the direction of air flow.

In the first position shown in FIG. 6A and the cross-section cut-away view of FIG. 6B, the opening 296 is aligned to provide operative fluid communication between a first side of the electrocaloric module 262 and the fan 280 and while the opening 294 is aligned to provide operative fluid communication between an inlet 284 in housing 270 and a first side of the electrocaloric module 264. It should be noted that the fans 280 and 282 are depicted in an operational state acting as exhausts (with 284/286/288/290 as inlets), but the fans 280/282 could also direct air inward to the electrocaloric modules (with 284/286/288/290 as outlets). The fans 280/282 can be configured to rotate in different directions, or could rotate in the same direction with oppositely pitched blades (in which case the fans 280/282 can optionally be mounted on a common drive shaft). As further shown in FIGS. 6A/6B, the opening 302 is aligned to provide operative fluid communication between the second side of the first electrocaloric module 264 and the fan 282 while the opening 300 is aligned to provide operative fluid communication between inlet 289 and a second side of the second electrocaloric module 262. This alignment and operation of the fans 280 and 282 provide fluid flow (represented by un-numbered arrows) from the first side of electrocaloric module 264 to the second side of electrocaloric module 264, and from the second side of the electrocaloric module 262 to the first side of the electrocaloric module 262.

FIG. 6C shows the heat transfer device 260 with the band(s) 292 in a second position. As shown in FIG. 6C, the opening 296 is aligned to provide operative fluid communication between the second side of the electrocaloric module 262 and the fan 282 and while the opening 294 is aligned to provide operative fluid communication between inlet 288 and a second side of the electrocaloric module 264. Also, as shown in FIG. 6B, the opening 302 is aligned to provide operative fluid communication between the first side of the first electrocaloric module 264 and the fan 280 while the opening 300 is aligned to provide operative fluid communication between inlet 286 and the first side of the second electrocaloric module 262. This alignment and operation of the fans 280 and 282 provide fluid flow (represented by un-numbered arrows) from the first side of electrocaloric module 262 to the second side of electrocaloric module 262, and from the second side of the electrocaloric module 264 to the first side of the electrocaloric module 264.

Figure 7A:
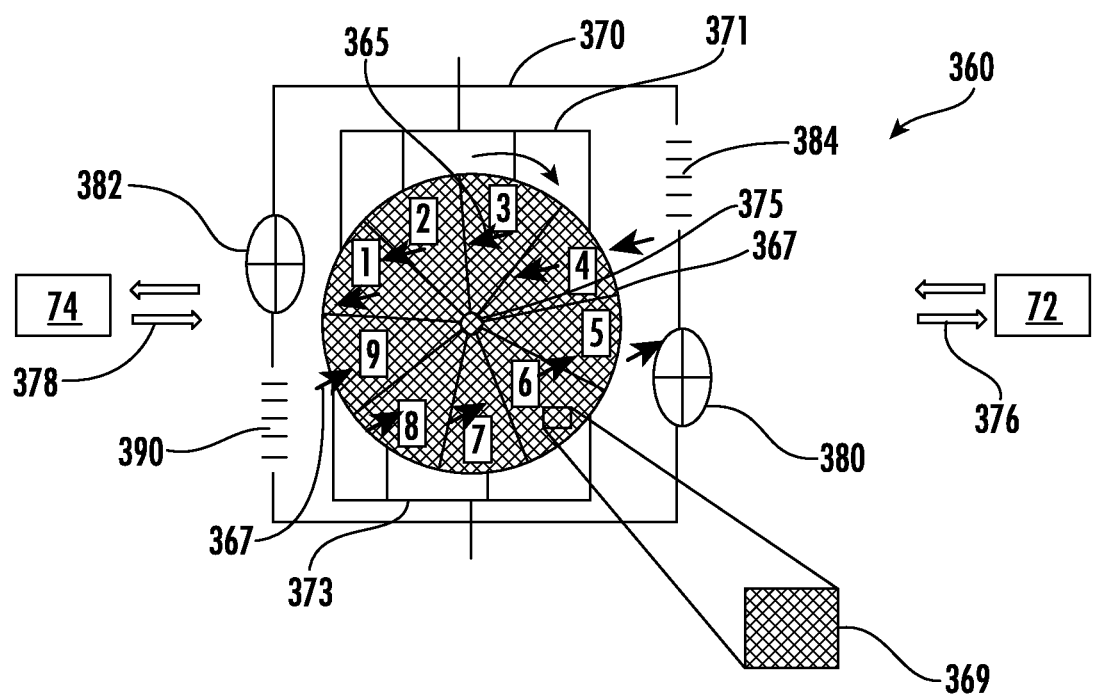
FIGS. 7A and 7B each schematically show an electrocaloric article with an example embodiment of a rotating electrocaloric element in different operational states.
Figure 7B:
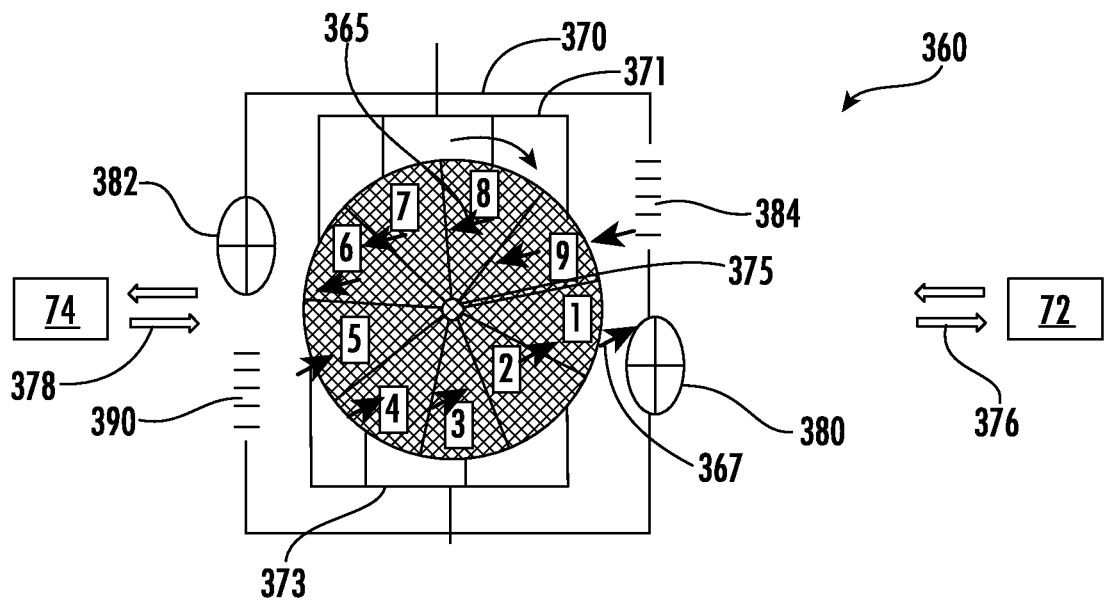

Another example embodiment of a rotary fluid control device is shown in a heat transfer device 360 in FIGS. 7A and 7B. In distinction to the example embodiments of FIGS. 3A/3B, 4A/4B, 5A/5B, and 6A/6B, which leave the electrocaloric material stationary while utilizing fluid flow guides to transition fluid flow along pathways to provide a bi-directional regenerative fluid flow to the electrocaloric material, the heat transfer device maintains the fluid flow pathway stationary relative to a rotating electrocaloric element. As shown in FIGS. 7A/7B, an electrocaloric element 367 is arranged with a positive polarity electrode 371 and a negative polarity electrode 373 disposed on opposite sides along the circumference of the electrocaloric element 367. The electrodes 371/373 can include brush or similar connections to distribute the charge evenly along the respective portions of the circumference of the electrocaloric element 367. A ground electrode 375 is located at the center of the electrocaloric element 367, which is also the axis of rotation (driven by a drive mechanism, not shown). The electrocaloric element is shown as numbered segments 1-9 for purposes of tracking rotation of the electrocaloric element in the Figures. In some embodiments, the numbered segments can be electrically isolated to promote uniform electric field density applied between the electrodes 371/373 and the electrical ground or neutral terminal 375. The electrocaloric element 367 is shown as disc-shaped, but can be other shapes to accommodate system design parameters. In some embodiments, the electrocaloric element can be formed from a honeycomb or other mesh or cellular structure as shown in the magnified portion 369 of the electrocaloric element 367. Such a honeycomb or other mesh or cellular structure can be formed by coating an electrocaloric polymer film onto a honeycomb, mesh, or cellular structure substrate, and can promote redistribution of physical stress and electrical current, particularly in the case of any damage to the electrocaloric element 367.

The electrocaloric element 367 is disposed in a housing 370 with fans 380/382 and openings (e.g., inlets) 384/390. During operation, the electrocaloric element 367 rotates about an axis coincident with the electrical ground 375. With the electrocaloric element 367 in the position shown in FIG. 7A, the electrocaloric segments 1-4 are subjected to a positive electrical polarity field from electrode 371 and fluid flow from the heat sink 72 toward the heat sink 74 along fluid transport flow path 376, module fluid flow path 365, through fan 382, and fluid transport flow path 378. Also as shown in FIG. 7A, the electrocaloric elements 6-9 are subjected to a negative electrical polarity field from electrode 373 and to fluid flow from the heat sink 72 toward the heat sink 74 along fluid transport flow path 378, module fluid flow path 365, through fan 380, and fluid transport flow path 376. Segment 5 is in discharge mode, not connected to a charged electrode. With the electrocaloric element 367 in the position shown in FIG. 7B, the electrocaloric segments 6-9 are now subjected to a reversal of both electric field polarity and fluid flow, with a positive electrical polarity field from the electrode 371 and fluid flow from the heat sink 72 toward the heat sink 74 along fluid transport flow path 376, module fluid flow path 365, through fan 382, and fluid transport flow path 378. Also as shown in FIG. 7A, the electrocaloric elements 2-5 are to a negative electrical polarity field from electrode 373 and to fluid flow from the heat sink 72 toward the heat sink 74 along fluid transport flow path 378, module fluid flow path 365, through fan 380, and fluid transport flow path 376. Segment 1 is in discharge mode in FIG. 7B.

As can be seen from FIGS. 7A and 7B, the direction of fluid flow from the perspective of the segments of the electrocaloric element 367 is reversed between FIGS. 7A and 7B, providing thermally regenerative back-and-forth flow to the segments. The electric field polarity experienced by the segments of the electrocaloric element 367 is reversed as well, allowing for substantial entropy changes of the electrocaloric material between FIG. 7A and FIG. 7B. Accordingly, simple rotation of the electrocaloric element 367 can provide a technical effect of a bi-directional back-and-forth flow experienced by the electrocaloric material that can promote enhanced internal thermal regeneration of the electrocaloric material (and concomitant enhanced temperature lift), as well as eliminating the need for complicated coordination of air flow and electrical charge (or even needing to change electrical charge at all during operation), since both air flow and electrical field are changed in response to simple rotation of the electrocaloric element during operation.

Although any directions described herein (e.g., "up", "down", "top", "bottom", "left", "right", "over", "under", etc.) are considered to be arbitrary and to not have any absolute meaning but only a meaning relative to other directions. For convenience, unless otherwise indicated, the terms shall be relative to the view of the Figure shown on the page, i.e., "up" or "top" refers to the top of the page, "bottom" or "under" refers to the bottom of the page, "right" to the right-hand side of the page, and "left" to the left-hand side of the page.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat transfer system, comprising
   a first electrocaloric module comprising an electrocaloric material disposed between electrodes, and a first module fluid flow path in operative fluid communication with the electrocaloric material, said first module fluid flow path extending from a first side of the first electrocaloric module to a second side of the first electrocaloric module;
   a second electrocaloric module comprising an electrocaloric material disposed between electrodes, and a second module fluid flow path in operative fluid communication with the electrocaloric material, said second module fluid flow path extending from a first side of the second electrocaloric module to a second side of the second electrocaloric module, wherein the first and second electrocaloric modules arranged to align the first side of the first electrocaloric module with the first side of the second electrocaloric module, and the second side of the first electrocaloric module with the second side of the second module;
   a first fluid transport flow path between a heat source and the first sides of the first and second electrocaloric modules;
   a second fluid transport flow path between a heat sink and the second sides of the first and second electrocaloric modules;
   a first prime mover arranged to direct a working fluid in a direction from the first fluid transport flow path through the first or second module fluid flow path to the second fluid transport flow path;
   a second prime mover arranged to direct a working fluid in a direction from the second fluid transport flow path through the first or second module fluid flow path to the first fluid transport flow path;
   a rotary fluid control device including a plurality of openings along the first and second fluid transport flow paths, said rotary fluid control device configured to rotate relative to the first and second electrocaloric modules between first and second positions, wherein
   in the first position, the first module flow path is in operative fluid communication through the openings with the first prime mover, and the second module flow path is in operative fluid communication through the openings with the second prime mover, and
   in the second position, the first module flow path is in operative fluid communication through the openings with the second prime mover, and the second module flow path is in operative fluid communication through the openings with the first prime mover;
   wherein the rotary fluid control device includes first, second, third, and fourth openings, wherein each of said first, second, third, and fourth openings is in controllable operative fluid communication between two of: the first side of the first electrocaloric module, the first side of the second electrocaloric module, the second side of the first electrocaloric module, and the second side of the second electrocaloric module,
   wherein the rotary fluid control device comprises a first valve member including the first and second openings disposed on the first fluid transport flow path, and a second valve member including the third and fourth openings disposed on the second fluid transport flow path, each of said first and second valve members configured to rotate between the first and second positions about an axis of rotation parallel to an axis extending between the first and second valve members.

2. The heat transfer system of claim 1, wherein:
   in the first position, the first module flow path is in operative fluid communication with the heat source through the first opening and in operative fluid communication with the heat sink through the third opening, and the second electrocaloric module is in operative fluid communication with the heat source through the second opening and is in operative fluid communication with the heat sink through the fourth opening, and
   in the second position, the first module flow path is in operative fluid communication with the heat source through the second opening and in operative fluid communication with the heat sink through the fourth opening, and the second electrocaloric module is in operative fluid communication with the heat source through the first opening and is in operative fluid communication with the heat sink through the third opening.

3. The heat transfer system of claim 1, wherein the openings of the rotary fluid control device are arranged to cause fluid flow along the first and second module fluid flow paths to be out of phase with respect to one another regarding direction of fluid movement along the first and second module fluid flow paths.

* * * * *